US012713250B2

(12) United States Patent
Patro et al.

(10) Patent No.: US 12,713,250 B2
(45) Date of Patent: Aug. 18, 2026

(54) INTELLIGENT RADIO ACCESS NETWORK (RAN) OPTIMIZATION FRAMEWORK AND METHOD

(71) Applicant: RAKUTEN SYMPHONY, INC., Tokyo (JP)

(72) Inventors: Ranjeet Kumar Patro, Indore (IN); Rajesh Goyal, Indore (IN); Ankur Chauhan, Bangalore (IN); Mudit Goel, Indore (IN); Shashank Misra, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 343 days.

(21) Appl. No.: 18/255,098

(22) PCT Filed: Feb. 27, 2023

(86) PCT No.: PCT/US2023/013925
§ 371 (c)(1),
(2) Date: May 31, 2023

(87) PCT Pub. No.: WO2024/181961
PCT Pub. Date: Sep. 6, 2024

(65) Prior Publication Data
US 2025/0080999 A1 Mar. 6, 2025

(51) Int. Cl.
*H04W 24/02* (2009.01)
*H04W 24/04* (2009.01)

(52) U.S. Cl.
CPC ........... *H04W 24/02* (2013.01); *H04W 24/04* (2013.01)

(58) Field of Classification Search
CPC .............................. H04W 24/02; H04W 24/04
See application file for complete search history.

(56) References Cited

U.S. PATENT DOCUMENTS

| | | | | |
|---|---|---|---|---|
| 11,128,545 | B2 * | 9/2021 | Bogineni | H04W 36/0033 |
| 11,910,451 | B2 * | 2/2024 | Song | H04W 8/26 |
| 11,968,612 | B2 * | 4/2024 | Berggren | H04W 40/248 |
| 12,096,344 | B2 * | 9/2024 | Godin | H04W 4/08 |
| 2009/0323600 | A1 * | 12/2009 | Chandra | H04W 28/18 370/437 |
| 2021/0377804 | A1 * | 12/2021 | Sivaraj | H04W 76/15 |

(Continued)

*Primary Examiner* — Syed Ali
(74) *Attorney, Agent, or Firm* — HAUPTMAN HAM, LLP

(57) ABSTRACT

An intelligent Radio Access Network (RAN) optimization framework. For an E2 Node, optimization services are initiated for handling by a Near-Real Time RAN Intelligent Controller (RIC) (Near-RT RIC). The E2 Node compares the performance to a first predetermined threshold. In response to the performance being below the first predetermined threshold, the E2 Node takes over optimization of the E2 Node. Otherwise, the Near-RT RIC continues optimization. The E2 Node compares the performance of the E2 Node to a second predetermined threshold. In response to the performance being below the second predetermined threshold, the Near RT RIC resumes handling the optimization. Otherwise, the E2 Node continues to handle the optimization of the performance of the E2 Node. For an Open-RAN Radio Unit (O-RU) Node, the O-RU Node performs local optimization of time-critical functions and a Non-RT RIC is able to perform optimization of non-time critical functions.

20 Claims, 10 Drawing Sheets

(56) References Cited

U.S. PATENT DOCUMENTS

| | | | | |
|---|---|---|---|---|
| 2022/0322192 | A1* | 10/2022 | Parekh | H04W 36/22 |
| 2024/0214926 | A1* | 6/2024 | Karaki | H04W 52/0206 |
| 2024/0259879 | A1* | 8/2024 | Ranganath | H04L 41/5054 |
| 2024/0267839 | A1* | 8/2024 | Cui | H04L 41/0895 |
| 2024/0414611 | A1* | 12/2024 | Tiwari | H04W 36/08 |
| 2025/0097825 | A1* | 3/2025 | Chandrashekar | H04W 92/14 |

* cited by examiner

500

510 RIC Subscription Suspend Message From E2 Node to Near-RT RIC

| IE/Group Name | Presence | Range | IE type and reference | Criticality | Assign Criticality |
|---|---|---|---|---|---|
| Message Type (520) | M | | As per O-RAN WG3 E2AP 9.2.3 | Yes | Reject |
| RIC Request ID (530) | M | | As per O-RAN WG3 E2AP 9.2.7 | Yes | Reject |
| RAN Function ID (540) | M | | As per O-RAN WG3 E2AP 9.2.8 | Yes | Reject |
| Suspend Cause (550) | M | | ENUMERATED (Message failure (552), Error (554), Performance, Degradation (556), ...) | Yes | Reject |

610 RIC Subscription Suspend Acknowledgement Message From Near-RT RIC to the E2 Node

| IE/Group Name | Presence | Range | IE type and reference | Criticality | Assigned Criticality |
|---|---|---|---|---|---|
| 620 Message Type | M | | As per O-RAN WG3 9.2.3 | Yes | Reject |
| 630 RIC Request ID | M | | As per O-RAN WG3 E2AP 9.2.7 | Yes | Reject |
| 640 RAN Function ID | M | | As per O-RAN WG3 E2AP 9.2.8 | Yes | Reject |

710 RIC Subscription Resume Message From E2 Node to Near-RT RIC

| | IE/Group Name | Presence | Range | IE type and reference | Criticality | Assign Criticality |
|---|---|---|---|---|---|---|
| 720 | Message Type | M | | As per O-RAN WG3 E2AP 9.2.3 | Yes | Reject |
| 730 | RIC Request ID | M | | As per O-RAN WG3 E2AP 9.2.7 | Yes | Reject |
| 740 | RAN Function ID | M | | As per O-RAN WG3 E2AP 9.2.8 | Yes | Reject |
| 750 | Suspend Cause | M | 752 | ENUMERATED (Message failure_Local, Error_Local, Performance Degradation_Local, ...) 754 756 | Yes | Reject |

FIG. 7

INTELLIGENT RADIO ACCESS NETWORK (RAN) OPTIMIZATION FRAMEWORK AND METHOD

RELATED APPLICATIONS

The present application is a National Phase of International Application No. PCT/US2023/013925, filed Feb. 27, 2023.

TECHNICAL FIELD

This description relates to providing an intelligent Radio Access Network (RAN) optimization framework, and method of using the same.

BACKGROUND

Network owners, network operators, service and application developers are able to evaluate how certain applications and services perform on a specific network based on a configuration using specific parameters or under specific operating conditions. For existing deployments, whether 2G, 3G, or 4G, there are algorithms running locally in the eNB, or base station. The algorithms provide for various optimizations, such energy consumption, throughput, latency and other KPIs. Network optimization is able to provide a significant impact on the performance of networks.

With 5G and the Radio Access Network (RAN) becoming open or virtualized, previous monolithic nodes are being segregated or divided into multiple components. 5G RAN are considered to be deployed with the algorithms involved with the optimization of the network being located in a central controller, which is referred to as a RAN Intelligent Controller (RIC). Moving the optimization to the RIC provides a holistic end-to-end view of the network. An Artificial Intelligence (AI)/Machine Learning (ML) framework located in the RIC platform helps to improve optimization. However, providing AI/ML at the local node is very expensive.

In Open RAN (O-RAN) functionalities are disaggregated into an O-RAN Central Unit (O-CU), an O-RAN Distributed Unit (O-DU), and an O-RAN Radio Unit (O-RU). The O-CU is further divided into an O-CU Control Plane (O-CU-CP) and an O-CU User Plane (O-CU-UP). These RAN functionalities are connected to intelligent controllers through open interfaces that can stream telemetry and deploy control actions and policies. The O-RAN architecture includes two RAN Intelligent Controllers (RICs) that perform management and control of the network: Near-Real time RIC (Near-RT RIC) and Non-Real time RIC (Non-RT RIC). RICs provide the end-to-end view of the network and apply AI/ML. A Near-RT RIC communicates with the E2 Nodes through an E2 interface and handles functions operating at near-real-time (e.g., 10 milliseconds to 1 second time scales). A Non-RT RIC handles functions operating at non-real time (e.g., more than 1 second time scales). Optimization is able to be provided based on a Near-RT RIC exchanging messages with the RAN nodes. E2 Nodes terminate in an E2 termination and include the O-DU, O-CU-CP, and O-CU-UP, as well as Next Generation Node B (O-gNB), and O-evolved Node B (O-eNB). The O-RU communicates with the Non-RT RIC through an Open Fronthaul (FH) Management Plane (M-Plane), and communicates with the O-DU through the Open FH Control, User and Synchronization (CUS) and M-plane An agreement is implemented between, for example, a next generation Node B (gNB) and a subscription for services is established between the RAN nodes and the Near-RT RIC. The Near-RT RIC determines what parameters and procedural changes to implement at the RAN nodes. A problem with that model is that the Near-RT RIC is capable of not providing the best optimization solutions.

SUMMARY

In at least embodiment, a method for providing intelligent Radio Access Network (RAN) optimization includes provisioning one or more Radio Access Network (RAN) Nodes, initiating optimization subscription services for handling optimization of performance of an E2 Node of the one or more RAN Nodes by a Near-Real Time RAN Intelligent Controller (RIC) (Near-RT RIC), determining whether the performance of the E2 Node as a result of the optimization of the performance of the E2 Node by the Near-RT RIC is below a first predetermined threshold, and in response to determining the performance of the E2 Node is below the first predetermined threshold, switching to optimization of the performance of the E2 Node by the E2 Node, else continuing to handle the optimization of the performance of the E2 Node by the Near-RT RIC.

In at least one embodiment, a Radio Access Network (RAN) Node includes a memory storing computer-readable instructions, and a processor connected to the memory, wherein the processor is configured to execute the computer-readable instructions to perform operations including providing RAN functions for one or more RAN Nodes in a mobile network, initiating optimization subscription services for handling optimization of performance of an E2 Node of the one or more RAN Nodes by a Near-Real Time RAN Intelligent Controller (RIC) (Near-RT RIC), determining whether the performance of the E2 Node as a result of the optimization of the performance of the E2 Node by the Near-RT RIC is below a first predetermined threshold, and in response to determining the performance of the E2 Node is below the first predetermined threshold, switching to optimization of the performance of the E2 Node by the E2 Node, else continuing to handle the optimization of the performance of the E2 Node by the Near-RT RIC.i In at least one embodiment, a non-transitory computer-readable media having computer-readable instructions stored thereon, which when executed by a processor causes the processor to perform operations including provisioning one or more Radio Access Network (RAN) Nodes, initiating optimization subscription services for handling optimization of performance of an E2 Node of the one or more RAN Nodes by a Near-Real Time RAN Intelligent Controller (RIC) (Near-RT RIC), determining whether the performance of the E2 Node as a result of the optimization of the performance of the E2 Node by the Near-RT RIC is below a first predetermined threshold, and in response to determining the performance of the E2 Node is below the first predetermined threshold, switching to optimization of the performance of the E2 Node by the E2 Node, else continuing to handle the optimization of the performance of the E2 Node by the Near-RT RIC.

BRIEF DESCRIPTION OF THE DRAWINGS

Aspects of the present disclosure are best understood from the following detailed description when read with the accompanying figures. It is noted that, in accordance with the practice in the industry, various features are not drawn to scale. In fact, the dimensions of the various features are able to be increased or reduced for clarity of discussion.

FIG. 5 shows information elements for a RIC Subscription Suspend Message according to at least one embodiment.

FIG. 6 shows information elements for a RIC Subscription Suspend Acknowledgement Message according to at least one embodiment.

FIG. 7 shows information elements for a RIC Subscription Resume Message according to at least one embodiment.

DETAILED DESCRIPTION

Figure 1:
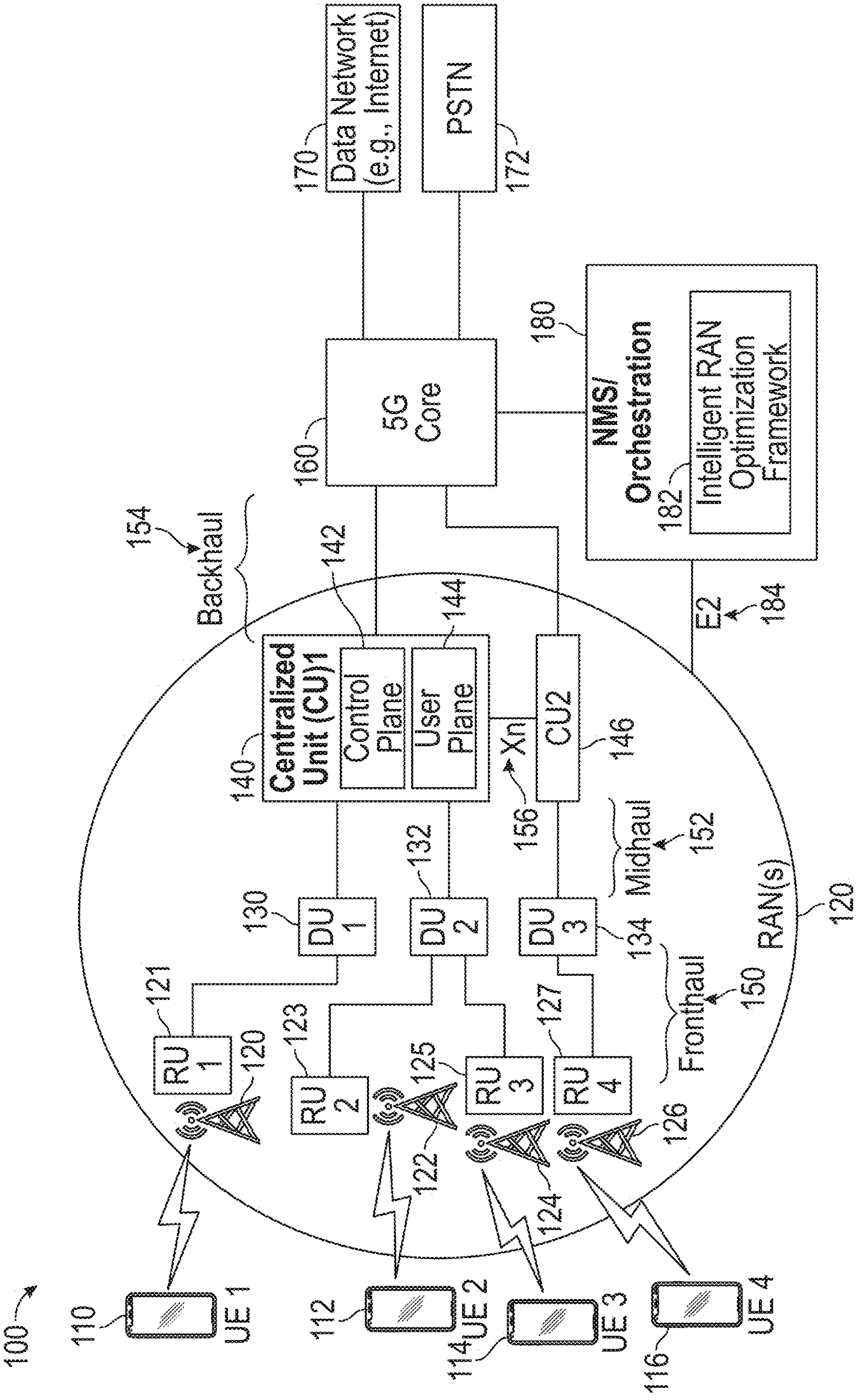
FIG. 1 illustrates a mobile network according to at least one embodiment.

Embodiments described herein describes examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not in dictate a relationship between the various embodiments and/or configurations discussed.

Further, spatially relative terms, such as “beneath,” “below,” “lower,” “above,” “upper” and the like, are used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus is otherwise oriented (rotated 90 degrees or at other orientations) and the spatially relative descriptors used herein likewise are interpreted accordingly.

Terms like “user equipment,” “mobile station,” “mobile,” “mobile device,” “subscriber station,” “subscriber equipment,” “access terminal,” “terminal,” “handset,” and similar terminology, refer to a wireless device utilized by a subscriber or user of a wireless communication service to receive or convey data, control, voice, video, sound, gaming, or a data-stream or signaling-stream. The foregoing terms are utilized interchangeably in the subject specification and related drawings. The terms “access point,” “base station,” “Node B,” “evolved Node B (eNode B),” next generation Node B (gNB), enhanced gNB (en-gNB), home Node B (HNB),” “home access point (HAP),” or the like refer to a wireless network component or apparatus that serves and receives data, control, voice, video, sound, gaming, or a data-stream or signaling-stream from UE.

In at least one embodiment, an Intelligent Radio Access Network (RAN) Optimization Framework is used to whether to use a Near-Real-Time (Near-RT or NRT) RAN Intelligent Controller (RIC) for centralized optimization or to switch to using a locally supported algorithms, e.g., at a RAN node (gNB), that is capable of providing better performance. The Framework determines whether a Radio Access Network (RAN) Node is an E2 Node or an Open RAN Radio Unit (O-RU) Node. Optimization subscription services is initiated for handling optimization of performance of the E2 Node by a Near-Real Time RAN Intelligent Controller (RIC) (Near-RT RIC). Optimization of the performance of the E2 Node is switched to the E2 Node in response to the performance being below a first threshold. Having the Near-RT RIC suspend handling of the optimization of the performance of the E2 is based on sending the Near-RT RIC a subscription suspension message. Optimization subscription services being handled by the Near RT RIC is resumed in response to the performance of the E2 being below a second threshold. In response to the RAN Node being determined to be the O-RU Node, a determination is made whether the functions are for time critical O-RU functions or non-critical O-RU functions. Based on the functions being time critical O-RU functions, the O-RU Node handles the optimization process. Based on the functions being non-time critical O-RU functions, Near-RT RIC/Non-RT RIC handles the optimization process via E2 termination at O-DU.

Embodiments described herein provide method that provides one or more advantages. For example, the Intelligent Radio Access Network (RAN) Optimization Framework provides an improvement in performance by using the method that achieves optimal performance, whether the method is centralized optimization controlled by a RAN Intelligent Controller (RIC), or localized optimization controlled by a RAN Node via the E2 interface. The Intelligent Radio Access Network (RAN) Optimization Framework provide improved handling of delay-sensitive use cases and RAN optimization functions. The Intelligent Radio Access Network (RAN) Optimization Framework also involves and uses a RIC as necessary for RAN optimization functions.

FIG. 1 illustrates a mobile network 100 according to at least one embodiment.

In FIG. 1 User Equipment (UE) 1 110, UE 2 112, UE 3 114, UE 4 116 communicate with Radio Unit (RU) 1 121, RU 2 123, RU 3 125, RU 4 127, respectively. Those skilled in the art understand that while a one-to-one correspondence between UE 1 110, UE 2 112, UE 3 114, UE 4 116 and RU 1 121, RU 2 123, RU 3 125, RU 4 127 is shown in FIG. 1, embodiments are not meant to be so limited. For example, many more UEs are able to connect with RU 1 121, RU 2 123, RU 3 125, RU 4 127. Further, additional RUs are able to be implemented.

RU 1 121, RU 2 123, RU 3 125, RU 4 127 are located at Towers 120, 122, 124, 126, respectively. RU 1 121 is shown in communication with Distributed Unit (DU) 1 130. RU 2 123 and RU 3 125 are shown in communication with DU 2 132. RU 4 127 is shown in communication with DU 3 134. DU 1 130 and DU 2 132 are in communication with Centralized Unit (CU) 1 140. DU 3 134 is in communication with CU 142. CU 1 140 is shown having a Control Plane 142 and a User Plane 144. Those skilled in the art understand that, although not shown in FIG. 1, CU 2 146 also includes a control plane and a user plane. Towers 120, 122, 124, 126, RU 1 121, RU 2 123, RU 3 125, RU 4 127, DU 1 130, DU 2 132, DU 3 134, and CU 1 140 and CU 2 142 represent one or more Radio Access Networks (RANs) 120.

RU 1 121, RU 2 123, RU 3 125, RU 4 127, and DU 1 130, DU 2 132, DU 3 134 communicate via a Fronthaul Interface 150. DU 1 130, DU 2 132, DU 3 134, and CU 1 140 and CU 2 142 communicate via a Midhaul Interface 152. CU 1 140 and CU 2 142 are coupled by an Xn Interface 156.

CU 1 140 and CU 2 142 communicate with 5G Core 160 via Backhaul Interface 154. 5G Core 160 provides UE 1 110, UE 2 112, UE 3 114, UE 4 116 access to Data Network 170, such as the Internet, and to voice networks, such as Public Switched Telephone Network 172.

A Network Management System and Orchestration System 180 is able to control, manage, and configure mobile network 100. Network Management System and Orchestration System 180 is shown coupled to 5G Core 160. Intelligent RAN Optimization Framework 182 has a direct connection with RAN 120 to provide Intelligent RAN Optimization to E2 Nodes, such as O-DU 220, O-CU-CP 221, O-CU-UP 222, O-gNB 223, and O-eNB 224. Network Management System and Orchestration System 180 is able to implement an Intelligent RAN Optimization Framework 182 by providing RAN optimization using a RIC service or a local service according to at least one embodiment.

Figure 2:
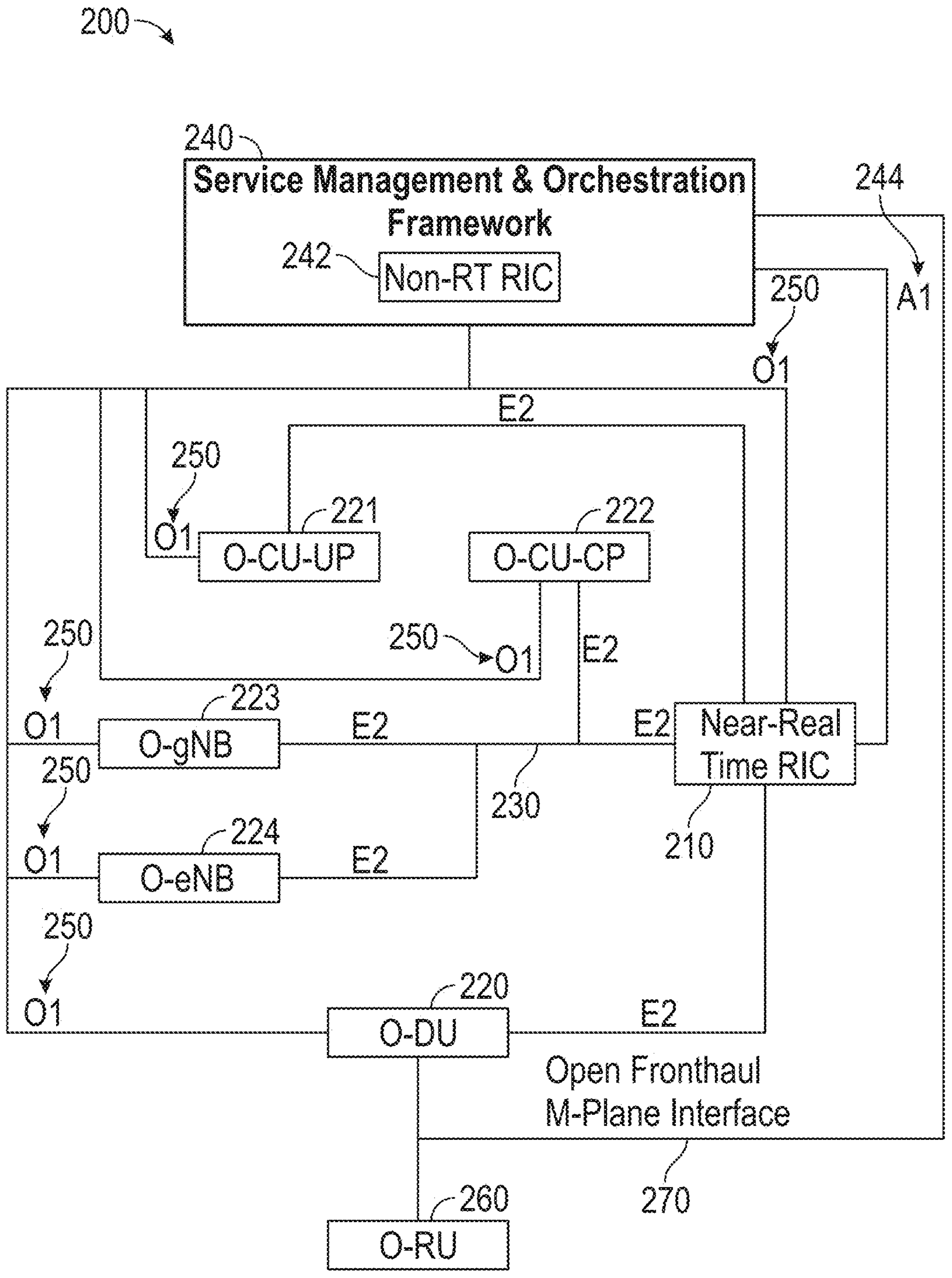
FIG. 2 is a function block diagram of O-RAN architecture for implementing an Intelligent RAN Optimization Framework by providing RAN optimization using a RIC service or a local service according to at least one embodiment.

FIG. 2 is a function block diagram of O-RAN architecture 200 for implementing an Intelligent RAN Optimization Framework by providing RAN optimization using a RIC service or a local service according to at least one embodiment.

In FIG. 2, A Near-Real-Time (RT) RAN Intelligent Controller (RIC) 210 performs optimization procedures. Near-RT RIC 210 and RAN Nodes, such as E2 Nodes 220, 221, 222, 223, 224, have an agreement for centralized optimization control by the Near-RT RIC 210. E2 Nodes include ORAN-Distributed Unit (O-DU) 220, O-Centralized Unit-Control Plane (O-CU-CP) 221, O-CU-User Plane (O-CU-UP) 222, Next Generation Node B (O-gNB) 223, and O-evolved Node B (O-eNB) 224. Near-RT RIC 210 is coupled to O-DU 220, O-CU-CP 221, O-CU-UP 222, O-gNB 223, and O-eNB 224 by E2 Interface 230. E2 Nodes are logical nodes that terminate using an E2 interface 230.

Next Generation NodeB (O-gNB) 223 is the radio base station in 5G NR networks. The O-gNB 223 includes independent Network Functions, which implement 3rd Generation Partnership Project (3GPP)-compliant 5G New Radio (NR) Radio Access Network (RAN) protocols such as Physical (PHY), Media Access Control (MAC), Radio Link Control (RLC), Packet Data Convergence Protocol (PDCP), Service Data Adaption Protocol (SDAP), Radio Resource Control (RRC), etc. The NR RAN protocols are able to run together or independently and are able to be deployed on either physical (e.g. a small cell chipset) or virtual resources (e.g. dedicated Commercial Off-The-Shelf (COTS) server or shared cloud resources).

The Evolved Node B (eNB) 224 is the Evolved-UMTS Terrestrial Radio Access Network (E-UTRAN) Node B, which is the element in LTE that is the evolution of the element Node B in UTRA of Universal Mobile Telecommunications System (UMTS). The O-eNB 224 is connected to the mobile phone network and communicates directly wirelessly with mobile handsets.

Service management & Orchestration Framework 240 includes Non-Real Time RIC (Non-RT RIC) 242. Near-RT RIC 210 communicates with Service management & Orchestration Framework 240 and Non-RT RIC 242 via A1 Interface 244. Service management & Orchestration Framework 240 and Non-RT RIC 242 communicate with O-DU 220, O-CU-CP 221, O-CU-UP 222, O-gNB 223, and O-eNB 224 using O1 Interface 250. O-DU 220 is coupled to ORAN Radio Unit (O-RU) 260 using an Open Fronthaul M-Plane Interface 270. Open Fronthaul M-Plane Interface 270 also enables communication between O-RU 260, and Service management & Orchestration Framework 240 and Non-RT RIC 242

In FIG. 2, Near-RT RIC 210 is the service provider and the E2 Nodes 220-224 are the service consumers. Most vendors of RANs implement data gathering and logging, and provide local algorithms that are capable of processing the data local to E2 Nodes 220-224 to achieve RAN optimization. Sometimes the locally supported algorithms at an E2 Node, such as O-DU 220, O-CU-UP 221, O-CU-CP 222, O-gNB 223, O-eNB 224, etc., are capable of providing better performance. Thus, improved performance of an E2 Nodes 220-224 is able to be provided by using the locally supported algorithms at an E2 Node rather than following commands from the N-RT RIC 210 for service optimization.

One or more of E2 Nodes 220-224 monitor the locally collected performance parameters and compares the optimization provided by the Near-RT RIC 210 to local optimization that, for example, E2 Node 220 is able to provide. While the optimization is able to be provided for any of E2 Nodes 220-224, optimization herein is explained using O-DU 220. A predetermined performance threshold is able to be used to compare the performance provided by the Near-RT RIC 210. E2 Node 220 determines that the optimization commands provided by the Near-RT RIC 210 results in performance that is less than a predetermined threshold. For example, the optimization commands provided by the Near-RT RIC 210 are capable of producing errors, or not meeting performance indicators such as latency, load balancing, or energy efficiency. The E2 Node 220 is able to be configured with local algorithms, or with newer or updated local algorithms that provide better performance optimization.

In response to the optimization commands provided by the Near-RT RIC 210 resulting in performance that is less than the predetermined threshold, E2 Node 220 suspends optimization by the Near-RT RIC 210 for the E2 Node 220 and E2 Node 220 initiates performance optimization using local algorithms of the E2 Node 220. The E2 Node 220 is also able to resume or revert back to having the Near-RT RIC 210 handle optimization for the E2 Node 220 by resuming subscription to the optimization commands provided by the Near-RT RIC 210.

Figure 3:
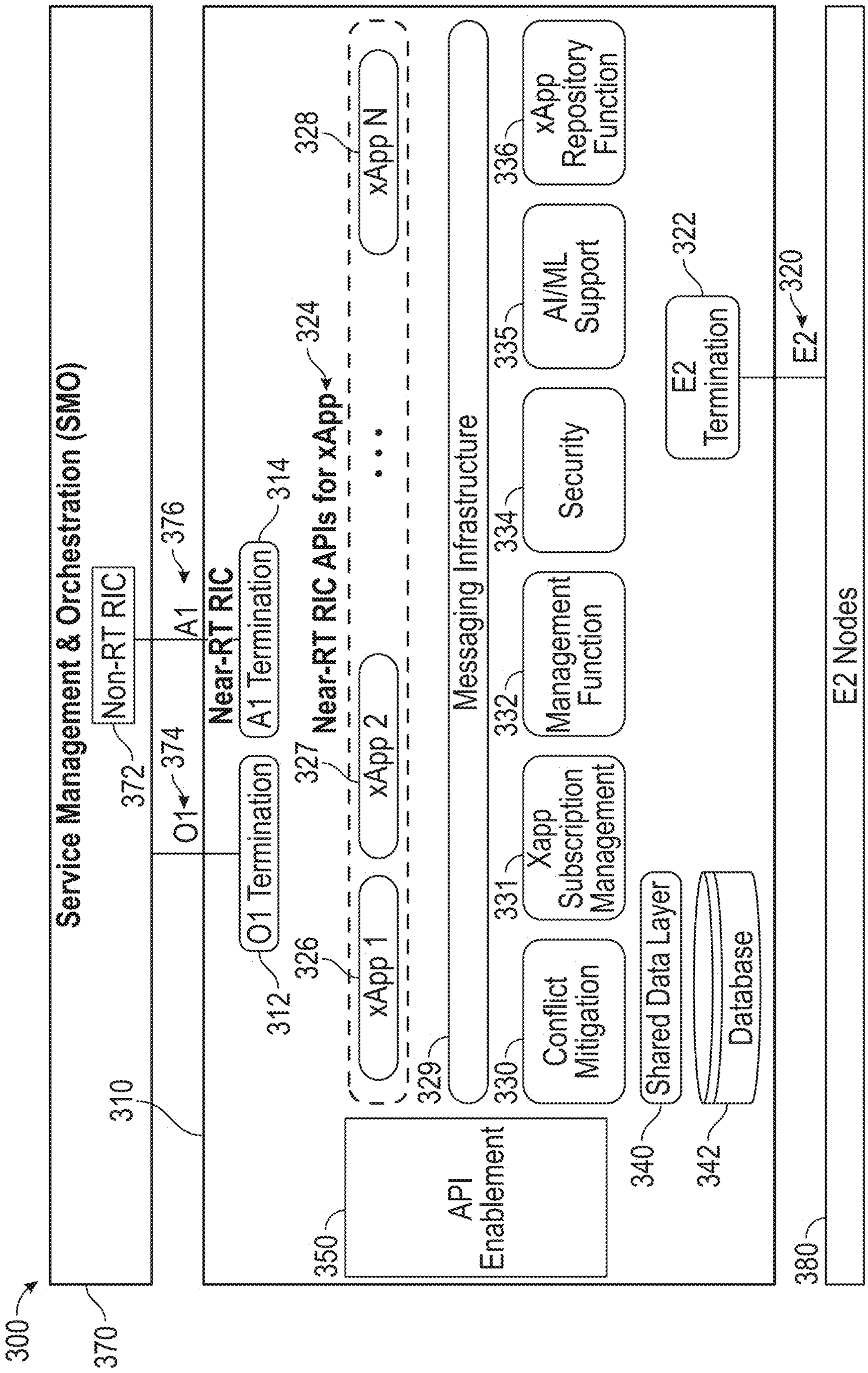
FIG. 3 is a block diagram of the architecture of a Near-RT RIC according to at least one embodiment.

FIG. 3 is a block diagram 300 of the architecture of a Near-RT RIC according to at least one embodiment.

In FIG. 3, the Near-RT RIC 310 is shown as a logical network node placed between the Service Management & Orchestration layer 370 and the E2 Nodes 380. The Service Management & Orchestration (SMO) layer 370 hosts the Non-RT RIC 372. The SMO 370 oversees the orchestration aspects, management and automation of RAN elements. SMO 370 supports O1 interfaces 374 and A1 interfaces 376. The Non-Real-Time RAN Intelligent Controller (Non-RT RIC) 372 is a logical function that enables non-real-time control and optimization of RAN elements and resources, AI/ML workflow including model training and updates, and policy-based guidance of applications/features in the Near-RT RIC 310.

The Near-RT RIC 310 is a logical function that enables near-real-time control and optimization of O-RAN elements and resources via fine-grained data collection and actions over the E2 interface 320 terminating at E2 Termination 322. The Near-RT RIC 310 provides interpretation and enforcement of policies from Non-RT RIC 372, and supports enrichment information to optimize control function.

The Near-RT RIC 310 includes A1 Termination 312 and O1 Termination 314. A1 Termination 312 terminates A1 interface 376 from Non-RT RIC 372. The A1 interface 376 is used for policy guidance. SMO 370 provides fine-grained policy guidance such as getting User-Equipment to change frequency, and other data enrichments to RAN functions over the A1 interface 376. The O1 Termination 312 terminates O1 interface 374 from SMO 370. The O1 interface 374 support managing the operation and maintenance (OAM) of multi-vendor Open RAN functions including fault, configuration, accounting, performance and security management, software management, and file management capabilities.

Near-RT RIC APIs for xApps 324 allow RRM control functionalities to be executed at the Near-RT RIC 310 and enforced in the E2 Nodes 380 via E2 interface 320. Near-RT RIC APIs for xApps 324 includes xApp 1 326, xApp 2 327, xApp N 328. Messaging Infrastructure 329 enables message interaction between internal functions of Near-RT RIC 310.

Conflict Mitigation 330 resolves potentially overlapping or conflicting requests from multiple xApps. xApp Subscription Management 331 merges subscriptions from different xApps and provides unified data distribution to xApps. A Management Function 332 provides fault management, configuration management, and performance management as a service producer to SMO 370, and provides logging, tracing and metrics collection, which capture, monitor and collect the status of internals of Near-RT RIC 310, which is transferred to external system for further evaluation.

Security 334 provides the security scheme for xApps. AI/ML 335 provides data pipelining, training, and performance monitoring for xApps. The xApp Repository Function 336 allows selection of xApps for A1 message routing based on A1 policy types and operator policies. The Near-RT RIC 310 provides APIs decoupled from specific implementation solutions, including a Shared Data Layer (SDL) 340 that works as an overlay for underlying Databases 342 and enables simplified data access. E2 termination 322 terminates E2 interface 320 from E2 Nodes 380.

E2 nodes 380 are logical functions that support the protocol layers and interfaces defined by 3GPP RAN (eNB for E-UTRAN and gNB/ng-eNB for NG-RAN). One Near-RT RIC 310 is able to be connected through transport functions to one or multiple E2 Nodes 380, although E2 Nodes 380 are able to be connected to a Near-RT RIC 310. The Near-RT RIC 310 uses the A1 interface 376 to receive policies, enrichment data, and ML models from the Non-RT RIC 372, and E2 interface 320 to collect near-real-time information from E2 Nodes 380 and carry out fine-grained Radio Resource Management (RRM) actions over E2 Nodes 380. Functions hosted by xApps 326, 327, 328 allow services to be executed at Near-RT RIC 310 and outcomes to be sent to E2 Nodes 380 via E2 interface 320. API Enablement 350 supports capabilities related to API operations of Near-RT RIC 310, such as API repository/registry, authentication, discovery, generic event subscription, etc.

Figure 4:
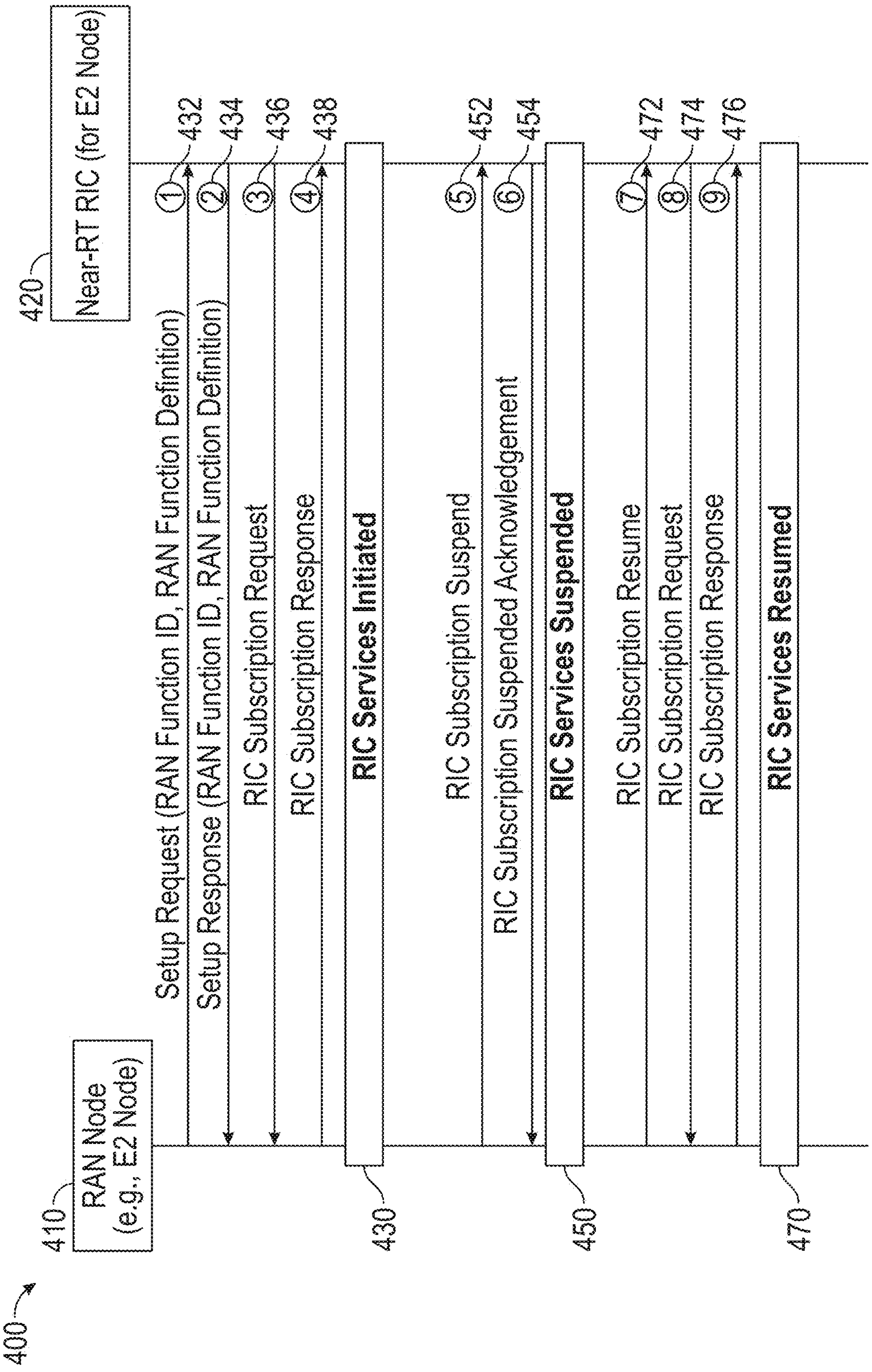
FIG. 4 is a flow diagram for E2 Subscription processes according to at least one embodiment.

FIG. 4 is a flow diagram 400 for E2 Subscription processes according to at least one embodiment.

In FIG. 4, the Subscription processes between RAN Node 410 and Near-RT RIC 420 include processes for RIC Services Initiated 430, RIC Services Suspended 450, and RIC Services Resumed 470. The purpose of the Subscription processes for the Near-RT RIC 420 is to enable an xApp to request subscriptions for REPORT, INSERT and/or POLICY service(s) from RAN Node 410 over an interface, such as E2 interface for E2 Nodes or Open Fronthaul M-Plane Interface for O-RU Node, and to ensure that validated and non-duplicate subscriptions are maintained by the Near-RT RIC 420 over the interface to the RAN Node 410 and that duplicated Subscription Request messages from xApps are handled properly.

A RAN Node 410 initiates the subscription procedure by sending the Setup Request message 432 including the appropriate data to a Near-RT RIC 420. For example, the Setup Request message 432 includes RAN function definitions which defines functions of the RAN supported by the RAN Node 410, Node identifier (ID) information, configurations supported by the RAN Node 410, etc.

The Near-RT RIC 420 replies with the Setup Response message 434 including the appropriate data, such as a list of RAN Functions Accepted and associated RAN Function IDs, and a list of RAN Functions Rejected, associated RAN Function IDs, and cause for rejection. The RAN Function ID is an indicator for the network function. A subscription is associated with the network function related to the RAN Function ID.

The Near-RT RIC 420 is also able to send the RAN Node a RIC Subscription Request message 436. The RIC Subscription Request message 436 is used to create a new Subscription in the RAN Node 410 at the request of a Near-RT RIC 420, and includes one or more of a RIC Request ID, a RAN Function ID, RIC Subscription Details, RIC Event Trigger Definition, a Sequence of Actions, a RIC Action ID, a RIC Action Type, a RIC Action Definition, and a RIC Subsequent Action.

The RAN Node 410 responds by sending the Near-RT RIC 420 a RIC Subscription Response message 438 to accept the request from a Near-RT RIC 420 to create a new event in the RAN Node 410. RIC Subscription Response message 438 includes one or more of a RIC Request ID, a RAN Function ID, and a RIC Actions Admitted List and associated RIC Action IDs, a RIC Actions Not Admitted List and associated RIC Action IDs and a cause. Thus, messages 1-4 for the RIC Services Initiated process are a part of the existing interface connection establishment. Messages 1-4 432, 434, 436, 438 for the RIC Services Initiated process 430 expose the optimization functions, network functions, etc.

The RAN Node 410 continues to monitor performance. RAN Node 410 determines whether central optimization provided by Near-RT RIC 420 is acceptable. RAN Node 410 determines the local algorithms are able to provide better performance optimization, for example, based on making a determination of whether the performance optimization for RAN Node 410 by Near-RT RIC 420 is less than a first predetermined threshold.

In response to RAN Node 410 determining that performance optimization for RAN Node, is not less than the first predetermined threshold, the RAN Node 410 continues to monitor the performance optimization of functions of the RAN Node 410 by the Near-RT RIC 420.

In response to RAN Node 410 determining that local algorithms are able to provide better performance optimization, for example, based on the performance of the Near-RT RIC 420 optimization being less than a predetermined threshold, the RAN Node 410 performs RIC Services Suspension process 450. The RAN Node 410 sends the Near-RT RIC 420 a RIC Subscription Suspend message 452.

In response, the Near-RT RIC 420 is able to send the RAN Node 410 a RIC Subscription Suspend Acknowledgement message 454. The RAN Node 410 is then able to take over the performance optimization of the RAN Node 410 using local optimization algorithms. For example, the RAN Node 410 is able to determine Subscriptions exists for X, Y, Z, and that there is a problem with Subscription X, but not Y and Z. Thus, the RAN Node 410 is able to suspend Subscription X. The RIC Subscription Suspend message 452 is able to provide the Near-RT RIC 420 an identification of the reason that the RAN Node 410 wants to suspend Subscription X. Thus, through the RIC Subscription Suspend message 452 and the RIC Subscription Suspend Acknowledge message 454, the RAN Node 410 and the Near-RT RIC 420 are able to reach an agreement about how the performance optimization of RAN Node 410 is to be optimized.

The RAN Node 410 continues to monitor performance. The RAN Node 410 determines whether performance optimization by the RAN Node 410 is less than a second predetermined threshold. In response to the performance optimization not being less than the second threshold, the RAN Node 410 continues to monitor the performance of the RAN Node 410.

In response to the performance optimization being less than a second threshold, The RAN Node 410 is able to have the Near-RT RIC 420 begin to handle the performance optimization. For example, in response to a change in performance, such as coverage improving or daily failures becoming less, the RAN Node 410 is able to communicate with the Near-RT RIC/Non-RT RIC 420 to have the Near-RT RIC 420 resume performance optimization for the RAN Node 410.

The RIC Services Resumed processes 470 are used to have RIC Services Resumed. The RAN Node 410 sends a RIC Subscription Resume message 472 to the Near-RT RIC 420. For example, the RAN Node 410 sends a RIC Subscription Resume message 472 identifying Subscription X to again be handled by the Near-RT RIC 420.

In response, the Near-RT RIC 420 responds to the RAN Node 410 with a RIC Subscription Request message 474. Again, the RIC Subscription Request message 474 is used to create a Subscription, e.g., for resuming Subscription X, and includes one or more of a RIC Request ID, a RAN Function ID, RIC Subscription Details, RIC Event Trigger Definition, a Sequence of Actions, a RIC Action ID, a RIC Action Type, a RIC Action Definition, and a RIC Subsequent Action.

The RAN Node 410 responds to the RIC Subscription Request message 474 from the Near-RT RIC 420 by sending the Near-RT RIC 420 a RIC Subscription Response message 476 to accept the request from the Near-RT RIC 420 to have the Near-RT RIC 420 resume Subscription X. Thus, through the RIC Subscription Resume Message 472, the RIC Subscription Request message 474, and the RIC Subscription Response message 476, the RAN Node 410 and the Near-RT RIC 420 are able to reach an agreement that the Near-RT RIC 420 is to resume handling the performance optimization for the RAN Node 410, including agreement of parameters for Subscription X. The RAN Node 410 returns to monitor performance optimization by the Near-RT RIC 420.

In at least one embodiment, the RIC Services Suspended processes 450 and RIC Services Resumed processes 470 are able to be repeated. However, the cycling between the RIC Services Suspended processes 450 and RIC Services Resumed processes 470 is not to be implemented too frequently. Thus, a timer is able to be used to control frequency of transitioning between the RIC Services Suspended processes 450 and RIC Services Resumed processes 470. For example, a timer is able to be used to cause the RAN Node 410 to wait a predetermined period of time, e.g., 1 hour, 4 hours, 10 hours, etc., before performing the RIC Services Suspended processes 450 again. The timer is able to be dependent on the network function involved.

FIG. 5 shows information elements for a RIC Subscription Suspend Message 500 according to at least one embodiment.

In FIG. 5, RIC Subscription Suspend Message 500 is sent from the E2 Node to the Near-RT RIC 510. The RIC Subscription Suspend Message 500 includes a Message Type Information Element (IE) 520 that uniquely identifies the type of message being sent. The RIC Request ID 530 includes the RIC Requestor ID and the RIC Instance ID. The RAN Function ID 540 indicates the RAN Function ID number that is unique within a given E2 Node.

The Suspend Cause 550 reports information obtained at the network level for suspending a subscription with the Near-RT RIC for performance optimization. The Suspend Cause provides the Near-RT RIC a reason that the E2 Node wants to suspend a subscription. For example, the E2 Node is able to identify, for example, message failure at the E2 Node 552, error at the E2 Node 554, and performance degradation at the E2 Node 556.

Thus, the E2 Node identifies an issue related to a message failure, message error, performance degradation, etc. because of the optimization function applied by the Near-RT RIC. While the Near-RT RIC is provided log information regarding performance parameters, the Near-RT RIC does not have direct access to information that the E2 Node has access to. Thus, the E2 Node is able to send a RIC Subscription Suspend message 500 to the Near-RT RIC to take over performance optimization at the local level, i.e., at the E2 Node level.

FIG. 6 shows information elements for a RIC Subscription Suspend Acknowledgement Message 600 according to at least one embodiment.

In FIG. 6, RIC Subscription Suspend Acknowledgement Message 600 is sent from the Near-RT RIC to the E2 Node 610. The RIC Subscription Suspend Acknowledgement Message 600 includes Message Type Information Elements 620, RIC Request ID Information Element 630, and a RAN Function ID Information element 640.

Message Type Information Element (IE) 520 uniquely identifies the type of message being sent. The RIC Request ID 630 includes the RIC Requestor ID and the RIC Instance ID. The RAN Function ID 640 indicates the RAN Function ID number that is unique within a given E2 Node.

The E2 Node is then able to take over the performance optimization of the E2 Node using local optimization algorithms. Through the RIC Subscription Suspend message 500 and the a RIC Subscription Suspend Acknowledge message 600, the E2 Node and the Near-RT RIC are able to reach an agreement about how the performance optimization of E2 Node is to be optimized.

FIG. 7 shows information elements for a RIC Subscription Resume Message 700 according to at least one embodiment.

In FIG. 7, RIC Subscription Resume Message 700 is sent from the E2 Node to Near-RT RIC 710. RIC Subscription Resume Message includes a Message Type Information Element (IE) 720 that uniquely identifies the type of message being sent.

The RIC Request ID 730 includes the RIC Requestor ID and the RIC Instance ID. The RAN Function ID 740 indicates the RAN Function ID number that is unique within a given E2 Node.

The Resume Cause 750 reports information obtained at the network level for resuming a subscription with the Near-RT RIC for performance optimization. The Resume Cause identifies to the Near-RT RIC a reason that the E2 Node wants to resume a subscription. For example, the E2 Node is able to identify a Suspend Cause based on message failure at the E2 node due to local optimization 752, error at the E2 node due to local optimization 754, and performance degradation at the E2 node due to local optimization 756. Thus, the E2 Node identifies an issue related to a message failure, message error, performance degradation, etc. because of the optimization function applied by the E2 Node. The E2 Node is able to send a RIC Subscription Resume Message 700 to the Near-RT RIC so that the Near-RT RIC resume performance optimization by the Near-RT RIC.

The same framework discussed above is able to be extended to Non-RT RIC nodes.

Referring again to FIG. 2, an O-Radio Unit (O-RU) 260 is coupled to an O-DU 220 via an Open Fronthaul M-Plane Interface 270. O-RU 260 converts radio signals sent to and from the antenna to a digital signal that can be transmitted over the fronthaul to O-DU 220. O-RU 260 includes a Synchronization and Fronthaul Transport, a Lower PHY Layer Baseband Processing, a Digital Front End (DFE), and an RF Front End (RF FE).

RIC services are not supported by O-RU 260 and there is no E2 interface between the O-RU 260 and the Near-RT RIC 210 or Non-RT RIC 242 due to time-criticality of functions of O-RU 260. Functions are able to be divided between time critical functions and non-time critical functions. In at least one embodiment, O-RU 260 is able to perform local optimization of time-critical functions and enables the optimization of non-time critical functions to be performed by the Near-RT RIC/Non-RT RIC 242 via E2 termination at O_DU.

The Non-RT RIC 242 is coupled to the Near-RT RIC 210 via the A1 interface 244. The Service Management and Orchestration Framework 240 collects data using FCAPS (Fault management, Configuration management, Accounting, Performance management and Security) interface.

The O1 Interface 250 and Open-Fronthaul M-plane Interfaces 270 provide an FCAPS interface with configuration, reconfiguration, registration, security, performance, monitoring aspects exchange with individual nodes, such as O-DU 220, O-CU-UP 221, O-CU-CP 222, O-RU 260, as well as Non-RT RIC 242 and RAN Nodes, e.g., O-gNB 223 and O-eNB 224.

The Service Management and Orchestration Framework 240 collects the data and sets policies that are provided to the Non-RT RIC 242. For example, a policy is able to be developed that the number of users is not to exceed 100 connected users for a particular node, such as the O-CU-CP Node 222. The policy is based on the collected data regarding performance parameters. The policy is then provided by the Non-RT RIC 242 to the Near-RT RIC 210 for optimizing a number of network functions. For example, a policy is able to be set to limit a number of connected users to 100 connected users, which is an important parameter for the network to operate optimally.

However, the policy regarding the limit of 100 connected users may not result in optimum performance because the view of the O-CU-CP Node 222 is a limit of 80 connected users. The O-CU-CP Node 222 determines itself that 80 connected users is the limit because the O-CU-CP Node 222 experiences a decrease in performance in response to having 100 connected users. Alternatively, the O-CU-CP Node 222 determines that the limit is 120 connected users because resources of the O-CU-CP Node 222 are underutilized the allocations that are being performed, the resource allocations are underutilized. The Near-RT RIC 210 informs the Non-RT RIC 242 that the Near-RT RIC 210 is able to make the decisions because the location of the Near-RT RIC 310 is better than the Non-RT RIC 242. However, this decision making does not involve time critical functions, but rather involves non-time critical functions.

In at least another embodiment, the Intelligent RAN Optimization Framework enables the O-RU 260 to handle time critical functions and non-time critical functions, as described below, despite there being no link between the Near-RT RIC 210. The O-RU 260 operates at, for example, 50-200 nanoseconds level compared to 1-100 milliseconds level of the Near-RT RIC 210. The functions of the O-RU 260 do not operate at the 50-200 nanoseconds level. There are certain functions that are able to operate at a 50 millisecond level.

The O-RU 260 determines whether functions of the O-RU are time critical functions or non-time critical functions. The Intelligent RAN Optimization Framework enables the O-RU 260 to have the Near-RT RIC 210/Non-RT RIC 242 handle non-time critical functions via E2 termination at O-DU, and the O-RU 260 handles the time critical functions. For example, the time critical functions are capable of being latency sensitive and using the Near-RT RIC 210/Non-RT RIC 242 for time critical functions will impact the performance of the O-RU 260. Thus, the functions of the O-RU 260 are divided into time critical functions that are optimized locally by the O-RU 260 and non-time critical functions that are optimized centrally by the Near-RT RIC 210/Non-RT RIC 242. The decision of whether a function is time critical and to be handled by the O-RU 260 or non-time critical and handled by the Non-RT RIC 242 is made by the O-RU Node 260. In response to the functions of the O-RU 260 being non-critical functions, Non-RT RIC Service(s) are initiated for the non-time critical RAN functions of O-RU Node 260 so the non-time critical RAN functions of O-RU Node 260 are handled by the Near-RT RIC 210/Non-RT RIC 242. The O-RU 260 monitors performance optimization of functions being optimized by the Near-RT RIC 210/Non-RT RIC 242.

Figure 8:
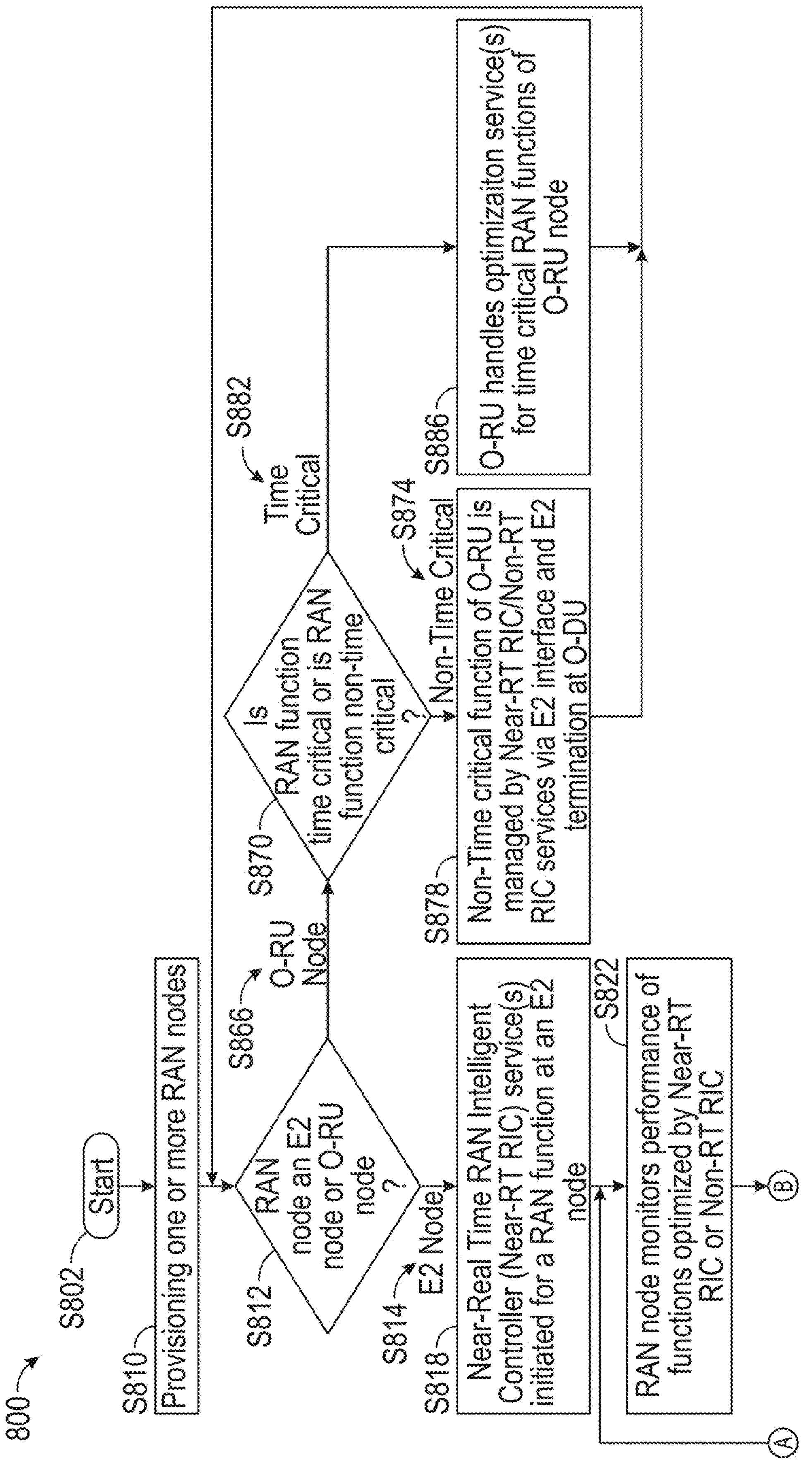
FIG. 8 is a flowchart of a method for providing RAN optimization using a RIC service or a local service according to at least one embodiment.
Figure 8:
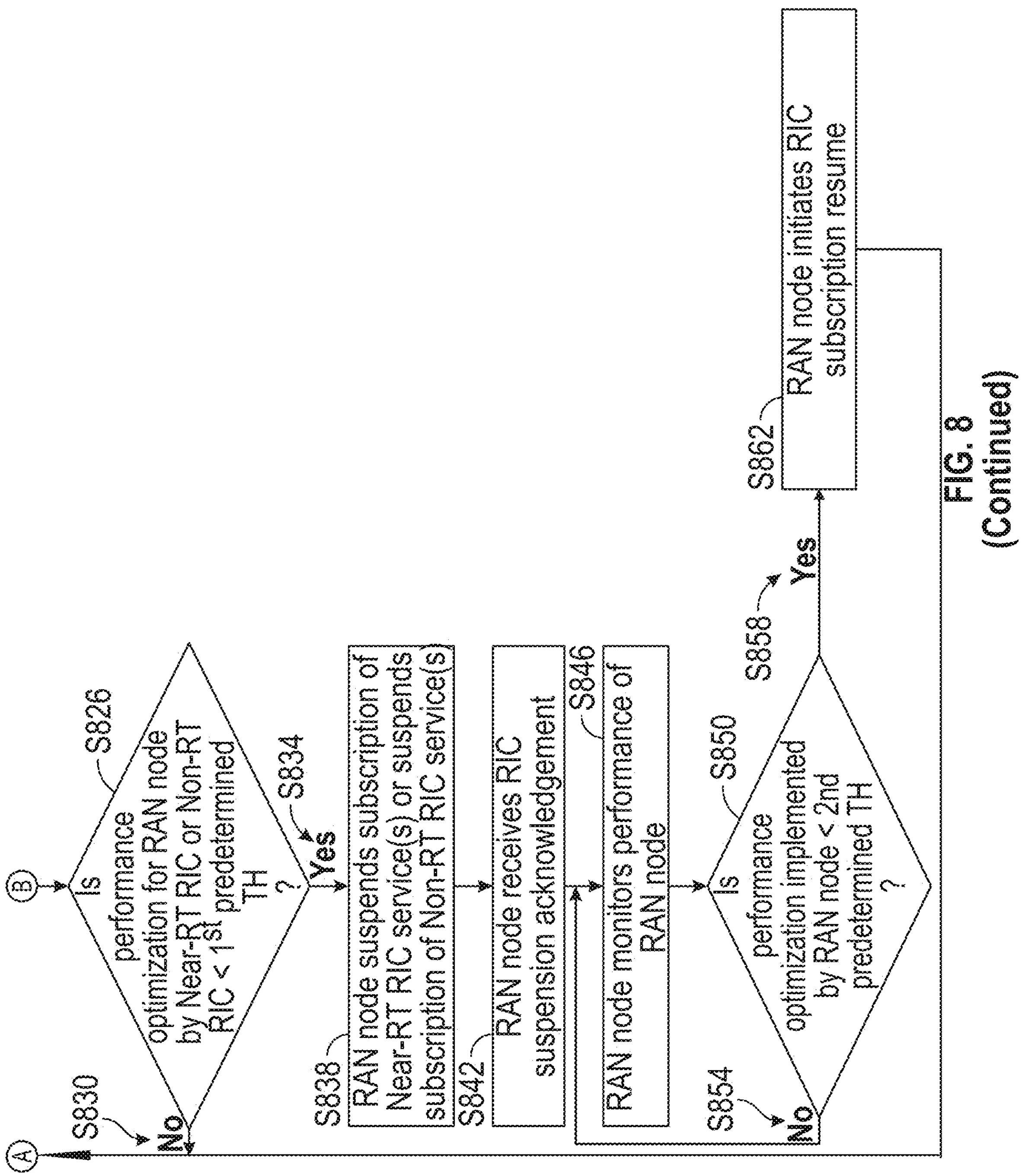

FIG. 8 is a flowchart 800 of a method for providing RAN optimization using a RIC service or a local service according to at least one embodiment.

In FIG. 8, the method starts S802 and one or more RAN Nodes are provisioned S810. Referring to FIG. 2, E2 Nodes include RAN Nodes, such as ORAN-Distributed Unit (O-DU) 220, O-Centralized Unit-Control Plane (O-CU-CP) 221, O-CU-User Plane (O-CU-UP) 222, Next Generation Node B (O-gNB) 223, and O-evolved Node B (O-eNB) 224. O-DU 220 is coupled to ORAN Radio Unit (O-RU) 260 using an Open Fronthaul M-Plane Interface 270. Open Fronthaul M-Plane Interface 270 also enables communication between O-RU 260, and Service management & Orchestration Framework 240 and Non-RT RIC 242.

The one or more RAN Noes are able to be an E2 Node S814 or an O-RU Node S866. Optimization subscription services are initiated for handling optimization of performance of the an E2 Node of the one or more RAN Nodes by a Near-Real Time RAN Intelligent Controller (RIC) (Near-RT RIC) S818. Referring to FIG. 4, a RAN Node 410 initiates the subscription procedure by sending the Setup Request message 432 including the appropriate data to a Near-RT RIC 420. For example, the Setup Request message 432 includes RAN function definitions which defines functions of the RAN supported by the RAN Node 410, Node identifier (ID) information, configurations supported by the RAN Node 410, etc. The Near-RT RIC 420 replies with the Setup Response message 434 including the appropriate data, such as a list of RAN Functions Accepted and associated RAN Function IDs, and a list of RAN Functions Rejected, associated RAN Function IDs, and cause for rejection. The RAN Function ID is an indicator for the network function. A subscription is associated with the network function related to the RAN Function ID. The Near-RT RIC 420 is also able to send the RAN Node a RIC Subscription Request message 436. The RIC Subscription Request message 436 is used to create a new Subscription in the RAN Node 410 at the request of a Near-RT RIC 420, and includes one or more of a RIC Request ID, a RAN Function ID, RIC Subscription Details, RIC Event Trigger Definition, a Sequence of Actions, a RIC Action ID, a RIC Action Type, a RIC Action Definition, and a RIC Subsequent Action. The RAN Node 410 responds by sending the Near-RT RIC 420 a RIC Subscription Response message 438 to accept the request from a Near-RT RIC 420 to create a new event in the RAN Node 410. RIC Subscription Response message 438 includes one or more of a RIC Request ID, a RAN Function ID, and a RIC Actions Admitted List and associated RIC Action IDs, a RIC Actions Not Admitted List and associated RIC Action IDs and a cause. Thus, messages 1-4 for the RIC Services Initiated process are a part of the existing interface connection establishment. Messages 1-4 432, 434, 436, 438 for the RIC Services Initiated process 430 expose the optimization functions, network functions, etc.

The RAN Node, such as an E2 Node determined at S814, monitors the performance of functions optimized by the Near-RT RIC S822. Referring to FIG. 4, the RAN Node 410 continues to monitor performance.

A determination is made whether performance optimization for RAN Node by Near-Real Time RIC is less than a first predetermined threshold S826. Referring to FIG. 4, RAN Node 410 determines whether central optimization provided by Near-RT RIC 420 is acceptable.

In response to the performance optimization by Near-Real Time RIC not being less than the first predetermined threshold S830, the process returns to have the RAN Node, e.g., E2 Node, continue to monitor the performance of functions optimized by the Near-RT RIC S822. Referring to FIG. 4, RAN Node 410 determines the local algorithms are able to provide better performance optimization, for example, based on making a determination of whether the performance optimization for RAN Node 410 by Near-RT RIC 420 is less than a first predetermined threshold.

In response to the performance optimization by Near-Real Time RIC being less than a predetermined threshold S834, the RAN Node, e.g., E2 Node, suspends subscription of Near-RT RIC Service(s) S838. Referring to FIG. 4, in response to RAN Node 410 determining that local algorithms are able to provide better performance optimization, for example, based on the performance of the Near-RT RIC 420 optimization being less than a predetermined threshold, the RAN Node 410 performs RIC Services Suspension process 450. The RAN Node 410 sends the Near-RT RIC 420 a RIC Subscription Suspend message 452.

E2 Node Receives Near-RT RIC suspension acknowledgement from the Near-RT RIC S842. Referring to FIG. 4, in response, the Near-RT RIC 420 is able to send the RAN Node 410 a RIC Subscription Suspend Acknowledgement message 454. The RAN Node 410 is then able to take over the performance optimization of the RAN Node 410 using local optimization algorithms. For example, the RAN Node 410 is able to determine Subscriptions exists for X, Y, Z, and that there is a problem with Subscription X, but not Y and Z. Thus, the RAN Node 410 is able to suspend Subscription X. The RIC Subscription Suspend message 452 is able to provide the Near-RT RIC 420 an identification of the reason that the RAN Node 410 wants to suspend Subscription X. Thus, through the RIC Subscription Suspend message 452 and the RIC Subscription Suspend Acknowledge message 454, the RAN Node 410 and the Near-RT RIC 420 are able to reach an agreement about how the performance optimization of RAN Node 410 is to be optimized.

The E2 Node monitors the performance of functions optimized by the RAN Node, such as E2 Node, S846. Referring to FIG. 4, the RAN Node 410 continues to monitor performance.

A determination is made whether performance optimization by the RAN Node, e.g., E2 Node, is less than a second predetermined threshold S850. Referring to FIG. 4, the RAN Node 410 determines whether performance optimization by the RAN Node 410 is less than a second predetermined threshold.

In response to the performance optimization by the RAN Node, e.g., E2 Node, not being less than the second predetermined threshold S854, the process returns to have the RAN Node, e.g., E2 Node, continue to monitor the performance of functions optimized by the E2 Node S846. Referring to FIG. 4, in response to the performance optimization not being less than the second threshold, the RAN Node 410 continues to monitor the performance of the RAN Node 410.

In response to the performance optimization by E2 Node being less than the second predetermined threshold S858, RAN Node, e.g., E2 Node, initiates Near-RT RIC subscription resume S862. Referring to FIG. 4, in response to the performance optimization being less than a second threshold, The RAN Node 410 is able to have the Near-RT RIC 420 begin to handle the performance optimization. For example, in response to a change in performance, such as coverage improving or daily failures becoming less, the RAN Node 410 is able to communicate with the Near-RT RIC 420 to have the Near-RT RIC 420 resume performance optimization for the RAN Node 410. The RIC Services Resumed processes 470 are used to have RIC Services Resumed. The RAN Node 410 sends a RIC Subscription Resume message 472 to the Near-RT RIC 420. For example, the RAN Node 410 sends a RIC Subscription Resume message 472 identifying Subscription X to again be handled by the Near-RT RIC/ 420. In response, the Near-RT RIC 420 responds to the RAN Node 410 with a RIC Subscription Request message 474. Again, the RIC Subscription Request message 474 is used to create a Subscription, e.g., for resuming Subscription X, and includes one or more of a RIC Request ID, a RAN Function ID, RIC Subscription Details, RIC Event Trigger Definition, a Sequence of Actions, a RIC Action ID, a RIC Action Type, a RIC Action Definition, and a RIC Subsequent Action. The RAN Node 410 responds to the RIC Subscription Request message 474 from the Near-RT RIC 420 by sending the Near-RT RIC 420 a RIC Subscription Response message 476 to accept the request from the Near-RT RIC/Non-RT RIC 420 to have the Near-RT RIC 420 resume Subscription X. Thus, through the RIC Subscription Resume Message 472, the RIC Subscription Request message 474, and the RIC Subscription Response message 476, the RAN Node 410 and the Near-RT RIC 420 are able to reach an agreement that the Near-RT RIC 420 is to resume handling the performance optimization for the RAN Node 410, including agreement of parameters for Subscription X.

The process returns to have the RAN Node, e.g., E2 Node, monitor the performance of functions optimized by the RIC, e.g., Near-RT RIC S822. Referring to FIG. 4, The RAN Node 410 returns to monitor performance optimization by the Near-RT RIC 420. The RIC Services Suspended processes 450 and RIC Services Resumed processes 470 are able to be repeated. However, the cycling between the RIC Services Suspended processes 450 and RIC Services Resumed processes 470 is not to be implemented too frequently. Thus, a timer is able to be used to control frequency of transitioning between the RIC Services Suspended processes 450 and RIC Services Resumed processes 470. For example, a timer is able to be used to cause the RAN Node 410 to wait a predetermined period of time, e.g., 1 hour, 4 hours, 10 hours, etc., before performing the RIC Services Suspended processes 450 again. The timer is able to be dependent on the network function involved.

Based on the RAN Node being an O-RU Node S866, whether the optimization of the performance of the an O-RU Node of the one or more RAN Nodes involves optimization of Time Critical O-RU functions or Non-Critical O-RU functions is determined S870. Referring to FIG. 2, the same Intelligent RAN Optimization Framework is able to be extended to Non-RT RIC nodes. RIC services are not supported by O-RU 260 and there is no E2 interface between the O-RU 260 and the Near-RT RIC 210 or Non-RT RIC 242 due to time-criticality of functions of O-RU 260. The Intelligent RAN Optimization Framework enables the O-RU 260 to have the Near-RT RIC 210/Non-RT RIC 242 handle non-time critical functions via E2 termination at O-DU, and the O-RU 260 handles the time critical functions. For example, the time critical functions are capable of being latency sensitive and using the Near-RT RIC 210/Non-RT RIC 242 for time critical functions will impact the performance of the O-RU 260. Thus, the functions of the O-RU 260 are divided into time critical functions that are optimized locally by the O-RU 260 and non-time critical functions that are optimized centrally by the Near-RT RIC 210/Non-RT RIC 242. The decision of whether a function is time critical and to be handled by the O-RU 260 or non-time critical and handled by the Near-RT RIC 210/Non-RT RIC 242 is made by the O-RU Node 260.

In response to the function of the RAN Node, e.g., O-RU, being non-time critical S874, Non-Time Critical Functions of the O-RU is managed by Near-RT RIC/Non-RT RIC Services via E2 Interface and E2 Termination at the O-DU S878. Referring to FIG. 2, in response to the functions of the O-RU 260 being non-time critical functions, Non-RT RIC Service(s) are initiated for the non-time critical RAN functions of O-RU Node 260 so the non-time critical RAN functions of O-RU Node 260 are handled by the Near-RT RIC 210/Non-RT RIC 242. The O-RU 260 monitors performance optimization of functions being optimized by the Near-RT RIC 210/Non-RT RIC 242.

The process returns to process other RAN Nodes S812.

In response to the function of the O-RU Node being time critical S882, O-RU handles optimization Service(s) for the time critical RAN functions of the O-RU Node S886. Referring to FIG. 2, the Intelligent RAN Optimization Framework enables the O-RU 260 to handle time critical functions.

The process returns to process other RAN Nodes S812.

In at least one embodiment, a method for providing intelligent Radio Access Network (RAN) optimization includes provisioning one or more Radio Access Network (RAN) Nodes, initiating optimization subscription services for handling optimization of performance of an E2 Node of the one or more RAN Nodes by a Near-Real Time RAN Intelligent Controller (RIC) (Near-RT RIC), determining whether the performance of the E2 Node as a result of the optimization of the performance of the E2 Node by the Near-RT RIC is below a first predetermined threshold, and in response to determining the performance of the E2 Node is below the first predetermined threshold, switching to optimization of the performance of the E2 Node by the E2 Node, else continuing to handle the optimization of the performance of the E2 Node by the Near-RT RIC.

Figure 9:
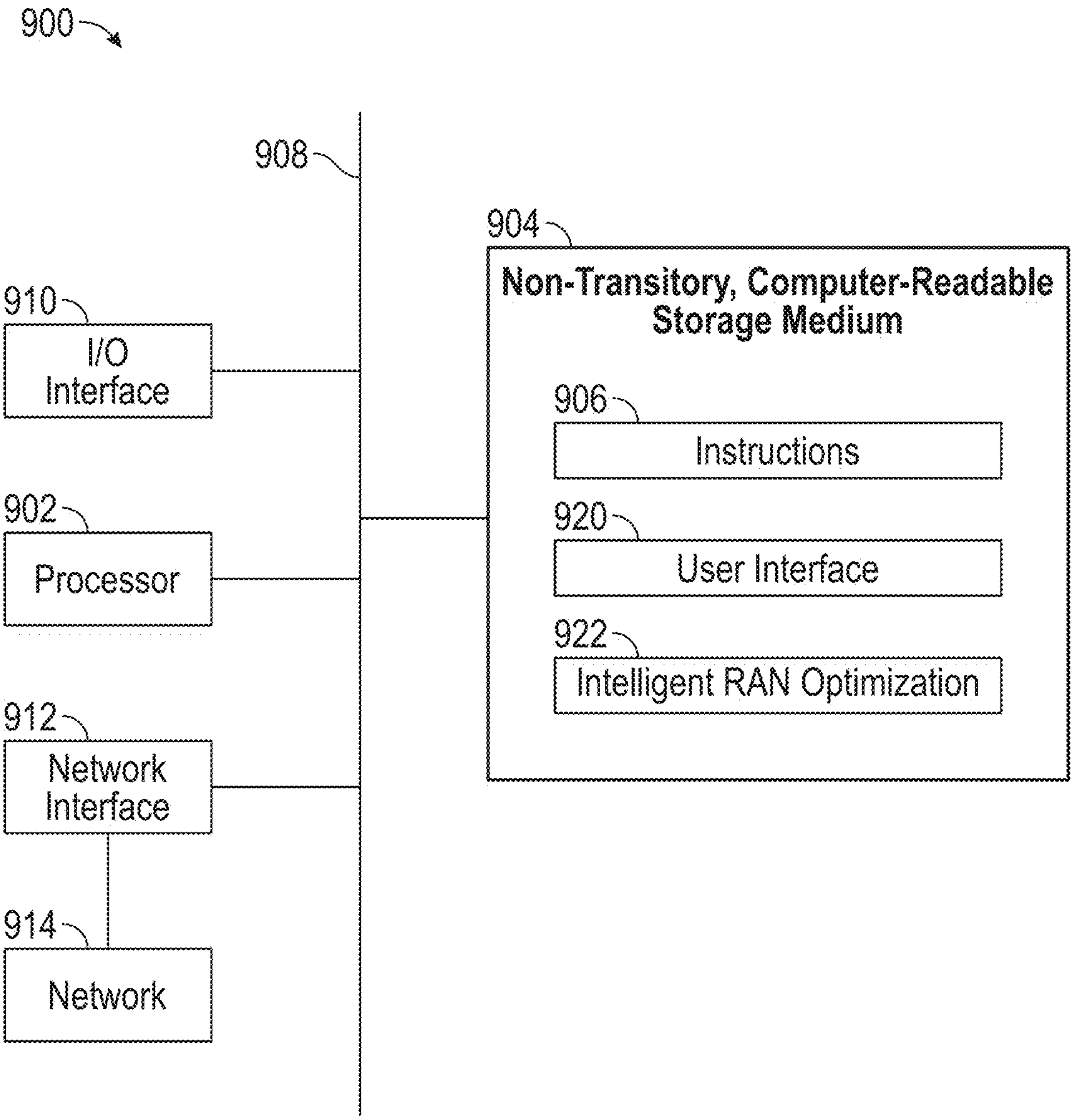
FIG. 9 is a high-level functional block diagram of a processor-based system according to at least one embodiment.

FIG. 9 is a high-level functional block diagram of a processor-based system 900 according to at least one embodiment.

In at least one embodiment, processing circuitry 900 provides an Intelligent RAN Optimization Framework. Processing circuitry 900 implements the Intelligent RAN Optimization Framework using Processor 902. Processing circuitry 900 also includes a Non-Transitory, Computer-Readable Storage Medium 904 that is used to implement the Intelligent RAN Optimization Framework. Non-Transitory, Computer-Readable Storage Medium 904, amongst other things, is encoded with, i.e., stores, Instructions 906, i.e., computer program code, that are executed by Processor 902 causes Processor 902 to perform operations for providing RAN optimization using a RIC service or a local service. Execution of Instructions 906 by Processor 902 represents (at least in part) an application which implements at least a portion of the methods described herein in accordance with one or more embodiments (hereinafter, the noted processes and/or methods).

Processor 902 is electrically coupled to Non-Transitory, Computer-Readable Storage Medium 904 via a Bus 908. Processor 902 is electrically coupled to an Input/Output (I/O) Interface 910 by Bus 908. A Network Interface 912 is also electrically connected to Processor 902 via Bus 908. Network Interface 912 is connected to a Network 914, so that Processor 902 and Non-Transitory, Computer-Readable Storage Medium 904 connect to external elements via Network 914. Processor 902 is configured to execute Instructions 906 encoded in Non-Transitory, Computer-Readable Storage Medium 904 to cause processing circuitry 900 to be usable for performing at least a portion of the processes and/or methods. In one or more embodiments, Processor 902 is a Central Processing Unit (CPU), a multi-processor, a distributed processing system, an Application Specific Integrated Circuit (ASIC), and/or a suitable processing unit.

Processing circuitry 900 includes I/O Interface 910. I/O interface 910 is coupled to external circuitry. In one or more embodiments, I/O Interface 910 includes a keyboard, keypad, mouse, trackball, trackpad, touchscreen, and/or cursor direction keys for communicating information and commands to Processor 902.

Processing circuitry 900 also includes Network Interface 912 coupled to Processor 902. Network Interface 912 allows processing circuitry 900 to communicate with Network 914, to which one or more other computer systems are connected. Network Interface 912 includes wireless network interfaces such as Bluetooth, Wi-Fi, Worldwide Interoperability for Microwave Access (WiMAX), General Packet Radio Service (GPRS), or Wideband Code Division Multiple Access (WCDMA); or wired network interfaces such as Ethernet, Universal Serial Bus (USB), or Institute of Electrical and Electronics Engineers (IEEE) 864.

Processing circuitry 900 is configured to receive information through I/O Interface 910. The information received through I/O Interface 910 includes one or more of instructions, data, design rules, libraries of cells, and/or other parameters for processing by Processor 902. The information is transferred to Processor 902 via Bus 908. Processing circuitry 900 is configured to receive information related to a User Interface (UI) 920 through I/O Interface 910. The information is stored in Non-Transitory, Computer-Readable Storage Medium 904 as UI 920.

In one or more embodiments, one or more Non-Transitory, Computer-Readable Storage Medium 904 having stored thereon Instructions 906 (in compressed or uncompressed form) that may be used to program a computer, processor, or other electronic device) to perform processes or methods described herein. The one or more Non-Transitory, Computer-Readable Storage Medium 904 include one or more of an electronic storage medium, a magnetic storage medium, an optical storage medium, a quantum storage medium, or the like.

For example, the Non-Transitory, Computer-Readable Storage Medium 904 includes, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. In one or more embodiments using optical disks, the one or more non-transitory computer-readable storage media 904 includes a Compact Disk-Read Only Memory (CD-ROM), a Compact Disk-Read/Write (CD-R/W), and/or a Digital Video Disc (DVD).

In one or more embodiments, Non-Transitory, Computer-Readable Storage Medium 904 stores Instructions 906 configured to cause Processor 902 to perform at least a portion of the processes and/or methods for implementing Intelligent RAN Optimization 922 by providing RAN optimization using a RIC service or a local service. In one or more embodiments, Non-Transitory, Computer-Readable Storage Medium 904 also stores information, such as algorithm which facilitates performing at least a portion of the processes and/or methods for implementing Intelligent RAN Optimization 922 by providing RAN optimization using a RIC service or a local service.

In at least one embodiment Processor 902 is configured to provide Radio Access Network (RAN) functions for a mobile network, provide RAN functions for one or more RAN Nodes in a mobile network, initiate optimization subscription services for handling optimization of performance of an E2 Node of the one or more RAN Nodes by a Near-Real Time RAN Intelligent Controller (RIC) (Near-RT RIC), determine whether the performance of the E2 Node as a result of the optimization of the performance of the E2 Node by the Near-RT RIC is below a first predetermined threshold, and in response to determining the performance of the E2 Node is below the first predetermined threshold, switch to optimization of the performance of the E2 Node by the E2 Node, else continue to handle the optimization of the performance of the E2 Node by the Near-RT RIC. Processor 902 is further configured to determine whether the performance of the E2 Node by the E2 Node is below a second predetermined threshold, and in response to the performance of the E2 Node being below the second predetermined threshold, resume the optimization subscription services for handling the optimization of the performance of the E2 Node by the Near RT RIC, else continue to handle the optimization of the performance of the E2 Node by the E2 Node. Processor 902 is further configured to resume optimization subscription services for handling optimization of the performance of the RAN functions by the Near RT RIC by sending a subscription resume message to the Near-RT RIC, receiving a subscription request form the Near-RT RIC for having the Near-RT RIC resume handling the optimization of the performance of the RAN functions, and sending a subscription response to the Near-RT RIC confirming the Near-RT RIC is to resume handling the optimization of the performance of the RAN functions. Processor 902 is further configured to initiate the optimization subscription services for handling the optimization of performance of the RAN functions by the Near RT RIC by sending a setup request to the Near RT RIC identifying at least one function of the RAN functions to be optimized, receiving a setup response from the Near RT RIC confirming the at least one function of the RAN functions to be optimized, receiving a subscription request for having the Near RT RIC handle the optimization of the performance of the at least one functions of the RAN functions, and sending a subscription response to the Near RT RIC confirming the Near-RT RIC is to handle the optimization of the performance of the at least one RAN functions. Processor 902 is further configured to switch to the optimization of the performance of the RAN functions by sending to the Near-RT RIC a subscription suspension message instructing the Near-RT RIC to suspend the handling the optimization of the performance of the RAN functions by the Near RT RIC and receiving a subscription suspend acknowledgement message from the Near RT RIC. Processor 902 is further configured to, in response to the determining the RAN functions are for the O-RU Node, determine whether the optimization of the performance of the RAN functions involves optimization of time critical RAN functions or non-critical RAN functions. Processor 902 is further configured to, in response to determining the optimization of the performance of the RAN functions involves the optimization of time critical RAN functions, handle the optimization of the time critical RAN functions by the processor, and in response to determining the optimization of the performance of the RAN functions involves the optimization of non-time critical RAN functions, handle the optimization of the non-time critical RAN functions by a Non-Real Time RIC.

Embodiments described herein provide a method that provides one or more advantages. For example, the Intelligent Radio Access Network (RAN) Optimization Framework provides an improvement in performance by using the method that achieves optimal performance, whether the method is centralized optimization controlled by a RAN Intelligent Controller (RIC), or localized optimization controlled by a RAN Node via the E2 interface. The Intelligent Radio Access Network (RAN) Optimization Framework provide improved handling of delay-sensitive use cases and RAN optimization functions. The Intelligent Radio Access Network (RAN) Optimization Framework also involves and uses a RIC as necessary for RAN optimization functions.

In a method according to at least one embodiment, a method for providing intelligent Radio Access Network (RAN) optimization includes provisioning one or more Radio Access Network (RAN) Nodes, initiating optimization subscription services for handling optimization of performance of an E2 Node of the one or more RAN Nodes by a Near-Real Time RAN Intelligent Controller (RIC) (Near-RT RIC), determining whether the performance of the E2 Node as a result of the optimization of the performance of the E2 Node by the Near-RT RIC is below a first predetermined threshold, and in response to determining the performance of the E2 Node is below the first predetermined threshold, switching to optimization of the performance of the E2 Node by the E2 Node, else continuing to handle the optimization of the performance of the E2 Node by the Near-RT NIC.

In a method according to at least one embodiment, the method further includes determining whether the performance of the E2 Node by the E2 Node is below a second predetermined threshold, and in response to the performance of the E2 Node being below the second predetermined threshold, resuming the optimization subscription services for handling the optimization of the performance of the E2 Node by the Near RT RIC, else continue to handle the optimization of the performance of the E2 Node by the E2 Node.

In a method according to at least one embodiment, the resuming the optimization subscription services for handling the optimization of the performance of the E2 Node by the Near RT RIC includes sending a subscription resume message to the Near-RT RIC, receiving a subscription request form the Near-RT RIC for having the Near-RT RIC resume handling the optimization of the performance of the E2 Node, and sending a subscription response to the Near-RT RIC confirming the Near-RT RIC is to resume handling the optimization of the performance of the E2 Node.

In a method according to at least one embodiment, the initiating the optimization subscription services for handling optimization of the performance of the E2 Node by the Near RT RIC includes sending a setup request to the Near RT RIC identifying at least one function of the E2 Node to be optimized, receiving a setup response from the Near RT RIC confirming the at least one function of the E2 Node to be optimized, receiving a subscription request for having the Near RT RIC handle the optimization of the performance of the at least one function of the E2 Node, and sending a subscription response to the Near RT RIC confirming the Near-RT RIC is to handle the optimization of the performance of the at least one function of the E2 Node.

In a method according to at least one embodiment, the switching to the optimization of the performance of the E2 Node by the E2 Node includes sending to the Near-RT RIC a subscription suspension message instructing the Near-RT RIC to suspend the handling the optimization of the performance of the E2 Node by the Near RT RIC and receiving a subscription suspend acknowledgement message from the Near RT RIC.

In a method according to at least one embodiment, in response to the one or more RAN Nodes being an O-RU Node, determining whether the optimization of the performance of the O-RU Node of the one or more RAN Nodes involves optimization of time critical O-RU functions or non-critical O-RU functions.

In a method according to at least one embodiment, the method further includes: in response to determining the optimization of the performance of the O-RU functions involves the optimization of time critical O-RU functions, handling the optimization of the time critical O-RU functions by the O-RU Node, and in response to determining the optimization of the performance of the O-RU functions involves the optimization of non-time critical O-RU functions, handling the optimization of the non-time critical O-RU functions by a Non-Real Time RIC.

In at least one embodiment, a Radio Access Network (RAN) Node includes a memory storing computer-readable instructions, and a processor connected to the memory, wherein the processor is configured to execute the computer-readable instructions to perform operations including providing RAN functions for one or more RAN Nodes in a mobile network, initiating optimization subscription services for handling optimization of performance of an E2 Node of the one or more RAN Nodes by a Near-Real Time RAN Intelligent Controller (RIC) (Near-RT RIC), determining whether the performance of the E2 Node as a result of the optimization of the performance of the E2 Node by the Near-RT RIC is below a first predetermined threshold, and in response to determining the performance of the E2 Node is below the first predetermined threshold, switching to optimization of the performance of the E2 Node by the E2 Node, else continuing to handle the optimization of the performance of the E2 Node by the Near-RT RIC.

In at least one embodiment, the processor is further configured to determine whether the performance of the E2 Node by the E2 Node is below a second predetermined threshold, and in response to the performance of the E2 Node being below the second predetermined threshold, to resume the optimization subscription services for handling the optimization of the performance of the E2 Node by the Near RT RIC, else the processor continues to handle the optimization of the performance of the E2 Node by the E2 Node.

In at least one embodiment, the processor is further configured to resume optimization subscription services for handling optimization of the performance of the RAN functions by the Near RT RIC by sending a subscription resume message to the Near-RT RIC, receiving a subscription request form the Near-RT RIC for having the Near-RT RIC resume handling the optimization of the performance of the RAN functions, and sending a subscription response to the Near-RT RIC confirming the Near-RT RIC is to resume handling the optimization of the performance of the RAN functions.

In at least one embodiment, the processor is further configured to initiate the optimization subscription services for handling the optimization of performance of the RAN functions by the Near RT RIC by sending a setup request to the Near RT RIC identifying at least one function of the RAN functions to be optimized, receiving a setup response from the Near RT RIC confirming the at least one function of the RAN functions to be optimized, receiving a subscription request for having the Near RT RIC handle the optimization of the performance of the at least one functions of the RAN functions, and sending a subscription response to the Near RT RIC confirming the Near-RT RIC is to handle the optimization of the performance of the at least one RAN functions.

In at least one embodiment, the processor is further configured to switch to the optimization of the performance of the RAN functions by sending to the Near-RT RIC a subscription suspension message instructing the Near-RT RIC to suspend the handling the optimization of the performance of the RAN functions by the Near RT RIC and receiving a subscription suspend acknowledgement message from the Near RT RIC.

In at least one embodiment, the processor is further configured to, in response to the one or more RAN Nodes being an O-RU Node, determine whether the optimization of the performance of the O-RU involves optimization of time critical RAN functions or non-critical RAN functions.

In at least one embodiment, the processor is further configured to: in response to determining the optimization of the performance of the RAN functions involves the optimization of time critical RAN functions, handling the optimization of the time critical RAN functions by the processor; and in response to determining the optimization of the performance of the RAN functions involves the optimization of non-time critical RAN functions, handling the optimization of the non-time critical RAN functions by a Non-Real Time RIC.

In at least one embodiment, a non-transitory computer-readable media having computer-readable instructions stored thereon, which when executed by a processor causes the processor to perform operations including provisioning one or more Radio Access Network (RAN) Nodes, initiating optimization subscription services for handling optimization of performance of an E2 Node of the one or more RAN Nodes by a Near-Real Time RAN Intelligent Controller (RIC) (Near-RT RIC), determining whether the performance of the E2 Node as a result of the optimization of the performance of the E2 Node by the Near-RT RIC is below a first predetermined threshold, and in response to determining the performance of the E2 Node is below the first predetermined threshold, switching to optimization of the performance of the E2 Node by the E2 Node, else continuing to handle the optimization of the performance of the E2 Node by the Near-RT RIC.

In a non-transitory computer-readable media according to at least one embodiment, the operations further include determining whether the performance of the E2 Node by the E2 Node is below a second predetermined threshold, and in response to the performance of the E2 Node being below the second predetermined threshold, resuming the optimization subscription services for handling the optimization of the performance of the E2 Node by the Near RT RIC, else continue to handle the optimization of the performance of the E2 Node by the E2 Node.

In a non-transitory computer-readable media according to at least one embodiment, the resuming the optimization subscription services for handling the optimization of the performance of the E2 Node by the Near RT RIC includes sending a subscription resume message to the Near-RT RIC, receiving a subscription request form the Near-RT RIC for having the Near-RT RIC resume handling the optimization of the performance of the E2 Node, and sending a subscription response to the Near-RT RIC confirming the Near-RT RIC is to resume handling the optimization of the performance of the E2 Node.

In a non-transitory computer-readable media according to at least one embodiment, the initiating the optimization subscription services for handling optimization of the performance of the E2 Node by the Near RT RIC includes sending a setup request to the Near RT RIC identifying at least one function of the E2 Node to be optimized, receiving a setup response from the Near RT RIC confirming the at least one function of the E2 Node to be optimized, receiving a subscription request for having the Near RT RIC handle the optimization of the performance of the at least one function of the E2 Node, and sending a subscription response to the Near RT RIC confirming the Near-RT RIC is to handle the optimization of the performance of the at least one function of the E2 Node.

In a non-transitory computer-readable media according to at least one embodiment, the switching to the optimization of the performance of the E2 Node by the E2 Node includes sending to the Near-RT RIC a subscription suspension message instructing the Near-RT RIC to suspend the handling the optimization of the performance of the E2 Node by the Near RT RIC and receiving a subscription suspend acknowledgement message from the Near RT RIC.

In a non-transitory computer-readable media according to at least one embodiment, the operations further include: in response to the one or more RAN Nodes being an O-RU Node, determining whether the optimization of the performance of the O-RU Node involves optimization of time critical O-RU functions or non-critical O-RU functions, in response to determining the optimization of the performance of the O-RU functions involves the optimization of time critical O-RU functions, handling the optimization of the time critical O-RU functions by the O-RU Node, and in response to determining the optimization of the performance of the O-RU functions involves the optimization of non-time critical O-RU functions, handling the optimization of the non-time critical O-RU functions by a Non-Real Time RIC.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. A method for providing intelligent Radio Access Network (RAN) optimization, comprising:

provisioning one or more Radio Access Network (RAN) Nodes;

initiating optimization subscription services for handling optimization of performance of an E2 Node of the one or more RAN Nodes by a Near-Real Time RAN Intelligent Controller (RIC) (Near-RT RIC);

determining, by the one or more RAN Nodes, whether the performance of the E2 Node as a result of the optimization of the performance of the E2 Node by the Near-RT RIC is below a first predetermined; and in response to determining, by the one or more RAN Nodes, the performance of the E2 Node is below the first predetermined threshold, switching, by the one or more RAN Nodes, to optimization of the performance of the E2 Node by the one or more RAN Nodes through the E2 Node, wherein the E2 node uses a local optimization algorithm at the E2 Node to process data local to the E2 Node to achieve the optimization of the performance of the E2 Node, else continuing to handle the optimization of the performance of the E2 Node by the Near-RT RIC.

2. The method of claim 1, further comprising determining whether the performance of the E2 Node by the E2 Node is below a second predetermined threshold, and in response to the performance of the E2 Node being below the second predetermined threshold, resuming the optimization subscription services for the handling the optimization of the performance of the E2 Node by the Near-RT RIC, else continue to handle the optimization of the performance of the E2 Node by the one or more RAN Nodes through the E2 Node.

3. The method of claim 2, wherein the resuming the optimization subscription services for the handling optimization of the performance of the E2 Node by the Near-RT RIC includes sending by the one or more RAN Nodes a subscription resume message to the Near-RT RIC, receiving by the one or more RAN Nodes a subscription request from the Near-RT RIC for having the Near-RT RIC resume the handling the optimization of the performance of the E2 Node, and sending a subscription response by the one or more RAN Nodes to the Near-RT RIC confirming the Near-RT RIC is to resume the handling the optimization of the performance of the E2 Node.

4. The method of claim 1, wherein the initiating the optimization subscription services for the handling optimization of the performance of the E2 Node by the Near-RT RIC includes sending a setup request by the one or more RAN Nodes to the Near-RT RIC identifying at least one function of the E2 Node to be optimized receiving a setup response by the one or more RAN Nodes from the Near-RT RIC confirming the at least one function of the E2 Node to be optimized based on the setup request sent to the Near-RT RIC, receiving a subscription request for having the Near-RT RIC handle the optimization of the performance of the at least one function of the E2 Node, and sending a subscription response by the one or more RAN Nodes to the Near-RT RIC confirming the Near-RT RIC is to handle the optimization of the performance of the at least one function of the E2 Node.

5. The method of claim 1, wherein the switching to the optimization of the performance of the E2 Node by the E2 Node includes sending by the one or more RAN Nodes to the Near-RT RIC a subscription suspension message instructing the Near-RT RIC to suspend the handling the optimization of the performance of the E2 Node by the Near-RT RIC and receiving a subscription suspend acknowledgement message by the one or more RAN Nodes from the Near-RT RIC.

6. The method of claim 1, further comprising, in response to the one or more RAN Nodes being an O-RU Node, determining whether the optimization of the performance of the O-RU Node of the one or more RAN Nodes involves optimization of time critical O-RU functions or non-time critical O-RU functions.

7. The method of claim 6 further comprising:

in response to determining the optimization of the performance of the O-RU Node involves the optimization of the time critical O-RU functions, handling the optimization of the time critical O-RU functions by the O-RU Node; and in response to determining the optimization of the performance of the O-RU Node involves the optimization of the non-time critical O-RU functions, handling the optimization of the non-time critical O-RU functions by a Non-Real Time RIC.

8. A Radio Access Network (RAN) Node, configured for:

providing RAN functions for one or more RAN Nodes in a mobile network;

initiating optimization subscription services for handling optimization of performance of an E2 Node of the one or more RAN Nodes by a Near-Real Time RAN Intelligent Controller (RIC) (Near-RT RIC);

determining whether the performance of the E2 Node as a result of the optimization of the performance of the E2 Node by the Near-RT RIC is below a first predetermined threshold; and in response to determining the performance of the E2 Node is below the first predetermined threshold, switching to optimization of the performance of the E2 Node by the E2 Node, wherein the E2 node uses a local optimization algorithm at the E2 Node to process data local to the E2 Node to achieve the optimization of the performance of the E2 Node, else continuing to handle the optimization of the performance of the E2 Node by the Near-RT RIC.

9. The RAN Node of claim 8, further configured to determine whether the performance of the E2 Node by the E2 Node is below a second predetermined threshold, and in response to the performance of the E2 Node being below the second predetermined threshold, to resume the optimization subscription services for the handling the optimization of the performance of the E2 Node by the Near-RT RIC, else continue to handle the optimization of the performance of the E2 Node by the E2 Node.

10. The RAN Node of claim 9, further configured to resume optimization subscription services for the handling optimization of the performance of the E2 Node by the Near-RT RIC by sending a subscription resume message to the Near-RT RIC, receiving a subscription request from the Near-RT RIC for having the Near-RT RIC resume the handling the optimization of the performance of the E2 Node, and sending a subscription response to the Near-RT RIC confirming the Near-RT RIC is to resume the handling the optimization of the performance of the E2 Node.

11. The RAN Node of claim 8, further configured to initiate the optimization subscription services for the handling the optimization of the performance of the E2 Node by the Near-RT RIC by sending a setup request to the Near-RT RIC identifying at least one function of the E2 Node to be optimized, receiving a setup response from the Near-RT RIC confirming the at least one function of the E2 Node to be optimized, receiving a subscription request for having the Near-RT RIC handle the optimization of the performance of the at least one function of the E2 Node, and sending a subscription response to the Near-RT RIC confirming the Near-RT RIC is to handle the optimization of the performance of the at least one function of the E2 Node.

12. The RAN Node of claim 8, further configured to switch to the optimization of the performance of the E2 Node by sending to the Near-RT RIC a subscription suspension message instructing the Near-RT RIC to suspend the handling the optimization of the performance of the E2 Node by the Near-RT RIC and receiving a subscription suspend acknowledgement message from the Near-RT RIC.

13. The RAN Node of claim 8, further configured to, in response to the one or more RAN Nodes being an O-RU Node, determine whether the optimization of the performance of the O-RU Node involves optimization of time critical O-RU or non-time critical O-RU.

14. The RAN Node of claim 13, further configured to:

in response to determining the optimization of the performance of the O-RU Node involves the optimization of the time critical O-RU functions, handling the optimization of the time critical O-RU functions; and in response to determining the optimization of the performance of the O-RU Node involves the optimization of the non-time critical O-RU functions, handling the optimization of the non-time critical O-RU functions by a Non-Real Time RIC.

15. A non-transitory computer-readable media having computer-readable instructions stored thereon, which when executed causes performance of operations comprising:

provisioning one or more Radio Access Network (RAN) Nodes;

initiating optimization subscription services for handling optimization of performance of an E2 Node the one or more RAN Nodes by a Near-Real Time RAN Intelligent Controller (RIC) (Near-RT RIC);

determining whether the performance of the E2 Node as a result of the optimization of the performance of the E2 Node by the Near-RT RIC is below a first predetermined threshold; and in response to determining the performance of the E2 Node is below the first predetermined threshold, switching to optimization of the performance of the E2

Node by the E2 Node, wherein the E2 node uses a local optimization algorithm at the E2 Node to process data local to the E2 Node to achieve the optimization of the performance of the E2 Node, else continuing to handle the optimization of the performance of the E2 Node by the Near-RT RIC.

16. The non-transitory computer-readable media of claim 15 further comprising determining whether the performance of the E2 Node by the E2 Node is below a second predetermined threshold, and in response to the performance of the E2 Node being below the second predetermined threshold, resuming the optimization subscription services for the handling the optimization of the performance of the E2 Node by the Near-RT RIC, else continue to handle the optimization of the performance of the E2 Node by the E2 Node.

17. The non-transitory computer-readable media of claim 16, wherein the resuming the optimization subscription services for the handling the optimization of the performance of the E2 Node by the Near-RT RIC includes sending a subscription resume message to the Near-RT RIC, receiving a subscription request from the Near-RT RIC for having the Near-RT RIC resume the handling the optimization of the performance of the E2 Node, and sending a subscription response to the Near-RT RIC confirming the Near-RT RIC is to resume the handling the optimization of the performance of the E2 Node.

18. The non-transitory computer-readable media of claim 15, wherein the initiating the optimization subscription services for the handling optimization of the performance of the E2 Node by the Near-RT RIC includes sending a setup request to the Near-RT RIC identifying at least one function of the E2 Node to be optimized, receiving a setup response from the Near-RT RIC confirming the at least one function of the E2 Node to be optimized, receiving a subscription request for having the Near-RT RIC handle the optimization of the performance of the at least one function of the E2 Node, and sending a subscription response to the Near-RT RIC confirming the Near-RT RIC is to handle the optimization of the performance of the at least one function of the E2 Node.

19. The non-transitory computer-readable media of claim 15, wherein the switching to the optimization of the performance of the E2 Node by the E2 Node includes sending to the Near-RT RIC a subscription suspension message instructing the Near-RT RIC to suspend the handling the optimization of the performance of the E2 Node by the Near-RT RIC and receiving a subscription suspend acknowledgement message from the Near-RT RIC.

20. The non-transitory computer-readable media of claim 15 further comprising:

in response to the one or more RAN Nodes being an O-RU Node, determining whether the optimization of the performance of the O-RU Node involves optimization of time critical O-RU functions or non-time critical O-RU functions;

in response to determining the optimization of the performance of the O-RU node involves the optimization of time critical O-RU functions, handling the optimization of the time critical O-RU functions by the O-RU Node; and in response to determining the optimization of the performance of the O-RU Node involves the optimization of non-time critical O-RU functions, handling the optimization of the non-time critical O-RU functions by a Non-Real Time RIC.

* * * * *